Jan. 2, 1962 W. J. REINECKER ET AL 3,015,188
MULCHING MACHINES
Filed Sept. 8, 1959 2 Sheets-Sheet 1

INVENTORS
WALTER J. REINECKER
DAVID J. WESTERGARD
BY Ralph W. Brimstead
THEIR ATTORNEY Jan. 2, 1962 W. J. REINECKER ET AL 3,015,188
MULCHING MACHINES
Filed Sept. 8, 1959 2 Sheets-Sheet 2

INVENTORS
WALTER J. REINECKER
DAVID J. WESTERGARD
BY Ralph W. Bumstead
THEIR ATTORNEY

# 3,015,188
MULCHING MACHINES
Walter J. Reinecker, North Plainfield, N.J. (1231 Martine Ave., Plainfield, N.J.), and David J. Westergard, Tuttle Road, Watchung, N.J.
Filed Sept. 8, 1959, Ser. No. 838,707
16 Claims. (Cl. 47—9)

This invention relates to a mulching machine and equipment of that character particularly designed for spreading a mulch over seeded ground, for example. The machine itself is intended to be hitched to a truck where bales of mulch material, including hay, straw, leaves, and the like can be broken open and fed into a hopper which forms part of the mulching machine. There the mulch is beaten and macerated and sucked by a fan into a discharge transition. It is then forced up through a spout which can be aimed in any direction and spread over the ground which is to be covered. This operation is well known and is quite frequently performed along the sides of new highways or in the space between the lanes of opposing travel.

Among a considerable number of objects to which we shall direct our attention in this specification, a primary object is to provide in a mulching machine or apparatus of that type a combination of power driven components, all of which are directly coupled to the engine shaft, thereby to avoid the use of power-robbing belt drives or other types of transmissions.

Another object is to provide an adjustable array of rotatable beater elements housed within a drum for processing mulch material, this array being combined with a blower fan on a common shaft which is directly driven by the engine. This same shaft can be used to drive a pump which is used for circulating some liquid such as an emulsion of asphalt. It is a common practice to mix an asphalt emulsion with the mulch material when it is discharged, so that the mulch material will stick where it falls and will have less tendency to be blown away or to be heaped up unevenly on the ground.

Further novel features of our mulching machine for which it is an object to provide improvements over the prior art will be brought out, say, for example, in the construction of a discharge spout so mounted as to swing freely through 360° of vertical axis and to be raised or lowered through a wide angle, say, 45° above and 15° below a level plane.

Still another object is to provide easy adjustment of the beater members as required for shredding different grades of mulch material. This adjustability may also be required at times in order to meet other variations in the character of the material to be mulched. Incidentally, the range of adjustment of the beater members provides for the mulching of material, so that its average length will possess any desired requirement.

Still another object of our invention is to provide facilities for removing debris from the loads that are fed into the hopper of the mulching machine. Oftentimes it has been found that such debris is baled up with the mulch material and when tossed into the hopper, considerable damage might result from its being sucked into the blower. So it is an object of our invention to provide an eject orifice at the bottom of the drum whereby this debris can be automatically spilled out onto the ground.

Still another object is to arrange for the utilization of the drum orifice just now mentioned in order to lessen the air resistance on the input side of the fan. This will be clearly understood from the fact that as hay is tossed into the hopper at the upper side of the drum, there is considerable variability of resistance to air-flow, especially when large clumps of hay are tossed in.

Still another object is to provide variability of connections between a re-circulating type spray system for the asphalt emulsion, so that in one case the emulsion can be drawn from a storage tank fastened along side the mulching machine itself; in another case, the asphalt supply can be had from a connection with a large tank on a trailer to be drawn behind the mulching machine; and in the third case, a connection to the system for the asphalt emulsion can be made with a tank carried on the truck ahead of the mulching machine.

There are various uses for our machine aside from its use to process mulch material. For example, this machine can be used to de-bale peat moss. It may be used for spreading fertilizer. It may be used for spreading insecticide.

Our invention will now be described in more detail, reference being had to the accompanying drawings in which.

Figure 1:
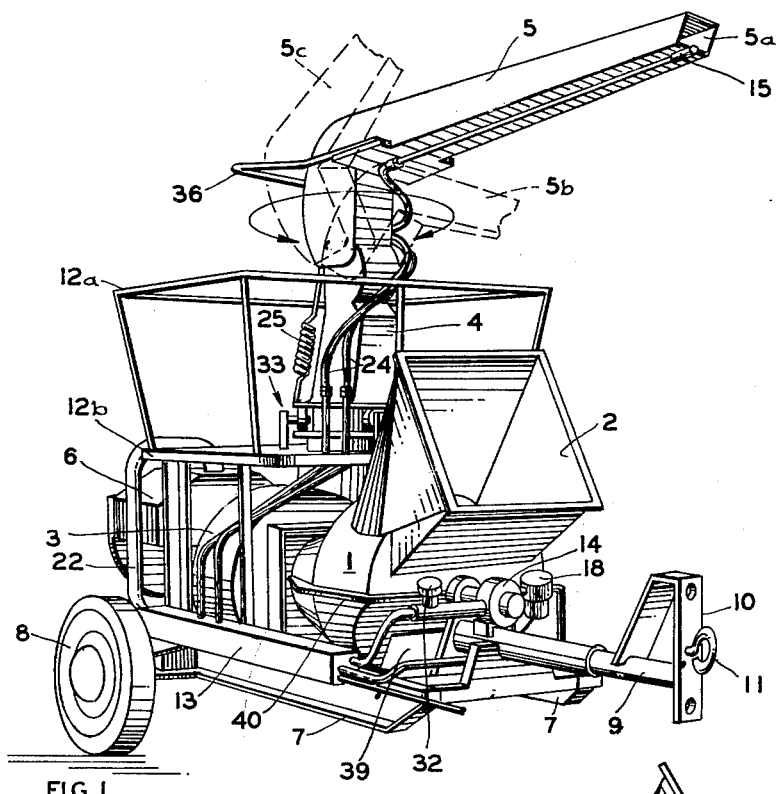
FIG. 1 shows a picture of the entire mulch machine as preferably constructed in order to provide such improvements as we believe to be novel and useful.
Figure 2:
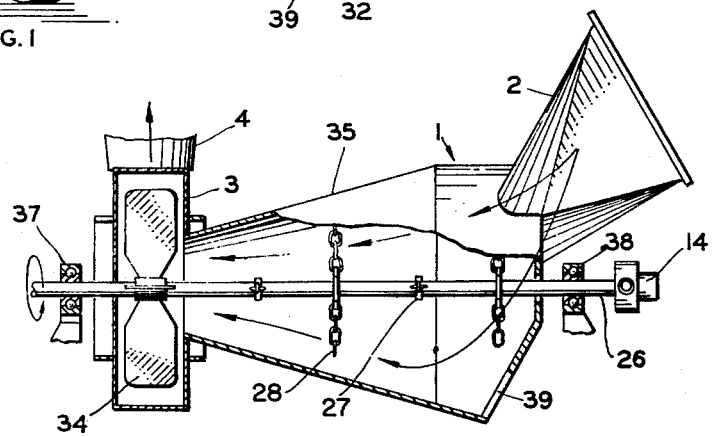
FIG. 2 is a vertical elevation view with portions broken out to show the interior of the drum and the fan housing.

Referring now to FIG. 1 of the drawing, we show a drum housing 1, at the upper side of which is mounted a hopper 2. At the rear of the drum housing is a fan housing 3 containing a fan whose blades are referenced 34 (FIG. 2). Still further to the rear is an internal combustion engine 6 which drives the main shaft 26, better shown in FIG. 2. It is preferable to construct the drum housing 1 in two sections having flanges 40 for joining them together. This arrangement facilitates making any such changes as are sometimes needed in the substitution or adjustment of beater chains 28 on the shaft 26.

Figure 3:
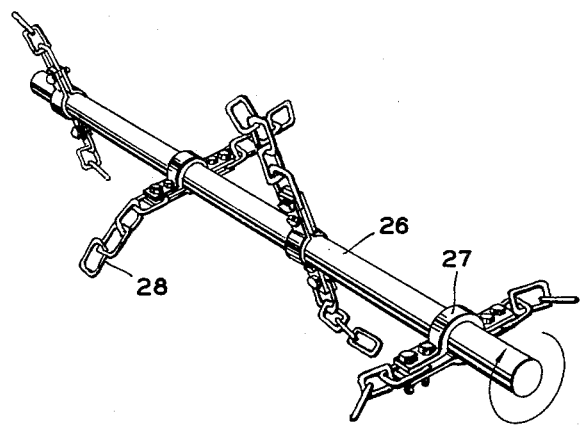
FIG. 3 is a fragmentary picture of the beater components mounted on the solitary shaft which extends forwardly from the engine.
Figure 4:
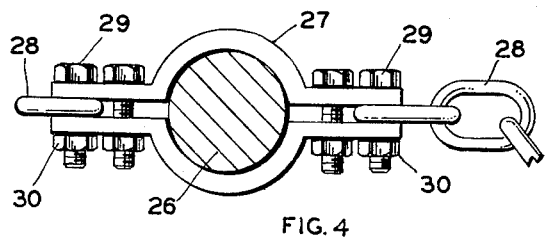
FIG. 4 shows a detailed view of the preferred construction for clamping beater chain sections onto a shaft which is coaxial with the engine shaft.

Mounted on this shaft are collars 27 to which, preferably, sections of link chain 28 are attached by means of bolts 29 and nuts 30 (FIG. 4). These components are better shown in FIGS. 3 and 4.

The shaft 26 rotates in bearings 37 and 38, as shown in FIG. 2. The drum housing has a conical portion 35, the tapering of which lends itself to the use of beater chains of greater length on the input end than on the end close to the fan. The adjustability of the collars 27 lengthwise of the shaft 26 (FIG. 3) is sometimes needed in order to process different grades of mulch material. For example, it is a common practice to use chain sections which have as many as five or six links at the forward end of the drum and only three links of such chain close to the fan. The intermediate chain assembly would have, say, only four links, but the number is not critical, and no limit is to be imposed on the number of links in any of these beater chain sections, nor as to their placement along the shaft.

In FIG. 2 we show an orifice 39 which allows debris or unwanted foreign matter of any type to be ejected before it is drawn into the fan. In this FIG. 2 also, we show the lower portion of transition 4 which, as otherwise seen in FIG. 1, leads up to an adjustable spout 5 for ejection and spreading of the mulch material. Underneath this spout 5 is a pipe having a nozzle 15 for ejection of the asphalt emulsion. The outlet for the mulch itself is shown at 5a. Adjustability of the spout can be seen by reference to its possible lowered position 5b and its raised position 5c, these positions being shown in dotted outline. A bearing plate and roller assembly 33 supports the rotatable portion of the pedestal for the spout 5. A balancing spring 25 is connected between some convenient portion of the spout 5 and the assembly 33 so as to provide compensation for weight of the spout beyond its vertical axis of rotation.

A control bar 36 is provided for the operator to grasp for aiming the spout in different directions and at different heights. The spout can be swung through an arc of 360°, which we believe to be a novel feature, and is made possible by vertue of the construction of the transition 4 and flexible hose-connections 24. A transition seal of suitable plastic material (not shown) is used to prevent the escape of air through the joint between the stationary and rotatable portions of the transition 4. The operator can stand on any part of the platform 12b while aiming the spout.

Other features of the mulching machine as shown in FIG. 1 include the chassis 7, wheels 8, a hitching bracket 10, mounted on a telescoping draw-bar, and a coupling link 11 by which the mulching machine can be drawn behind a truck. An enclosure rail 12a serves to guard the operator from falling off of the platform 12b.

Figure 7:
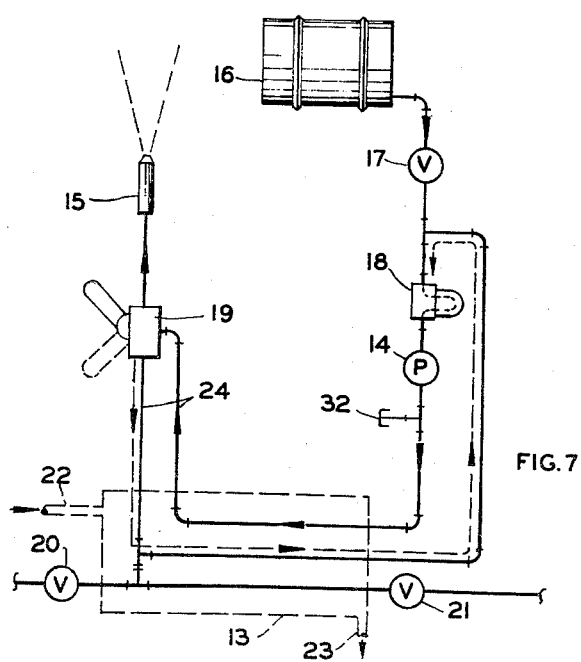
FIG. 7 shows diagramatically a piping arrangement with associated components for re-circulating and spraying an asphalt emulsion.

It is common practice to heat the asphalt emulsion, although at times this may not be necessary. There is provided, however, a pre-heater 13, through which the exhaust from the motor may be circulated around the input and outlet pipes for the asphalt emulsion. These pipes are shown in FIG. 7 and how the circulation of the emulsion may be provided. There it will be seen how we can provide a tank 16 for the emulsion itself. This is fed through a value 17 and is drawn through a strainer 18 by a pump 14 and through the pre-heater 13 which has a motor exhaust inlet 22 and outlet 23. The emulsion is then fed up through a valve 19 and can be ejected by a spray nozzle at the end of the mulch discharge spout 5. The valve 19 must be adjusted one way for this operation, but when the emulsion is not to be combined with the mulch, valve 19 would be set in another position to re-circulate the emulsion through the heater so as to keep it of proper consistency.

There is provided a primer cap 32, so that when starting up operations, the pump may be primed by the input of a suitable amount of the emulsion. The pump 14 is of such a character that it may best be primed from the opening under this cap 32 leading through the outlet side of the pump connections. Variations of the pump construction may, however, indicate the need for connecting the primer cap connection between the strainer 18 and the pump 14, that is, on the input side of the pump.

When the asphalt emulsion is to be fed from a tank on the leading truck in front of the mulching machine, a valve 21 may be used for the input of the emulsion. On the other hand, if such feed were to be provided from a tank on the trailer behind the mulching machine, then valve 20 would be opened for a connection from the tank on such a trailer.

The pipe and hose connections 24 are shown both in FIG. 1 and FIG. 7 in order to make clear how the valve 19 may be placed within reach of the operator who stands on the platform 12b. In FIG. 1, therefore, we show flexible hose and pipe connections 24 arranged for the easy rotation of the spout 5 through an arc of 360°.

In normal operation of our mulching machine there are times when the asphalt emulsion should be ejected along with the mulch material. There are other times when the emulsion is not needed and valve 19 may then be set for re-circulation without going up to the nozzle 15.

The use of ordinary chain links, as shown in FIGS. 3 and 4, has been found to be very effective in macerating and breaking up the mulch material into strands of whatever length may be found desirable. We have found in practice that these chain link beaters have considerable advantage over beaters of fixed and stable construction. The links give when they meet with undue obstructions as may be found in the mulch material. The straight-through shaft 26 appears to be a vast improvement over the use of transmission equipment between the engine and the beaters, since there is no robbing of power in order to drive the beaters and the pump. There are only two bearings to maintain, aside from those in the engine itself. These are shown as 37 and 38.

The raising and lowering of the spout vertically, say through 60°, enables our mulching machine to spread mulch material more effectively and over a wider area than has been accomplished heretofore. We have found that experienced crews can spread as much as twenty-five tons of mulch material per day and can throw this mulch material as far as eighty-five feet from the spout which we use. We mention these facts, however, without wanting to impose any limitations on the capabilities of our mulching machine. Variations of construction would undoubtedly enable us to exceed any limitations of that character.

Figure 5:
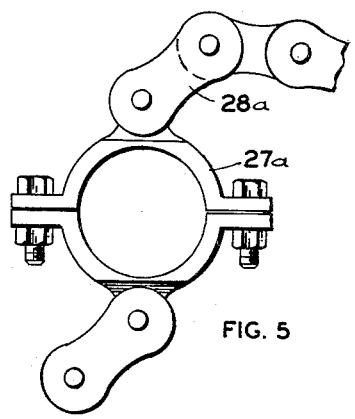
FIG. 5 shows an alternative construction where in place of loose-link chains, we may use chain sections of ordinary transmission chain linkages.
Figure 6:
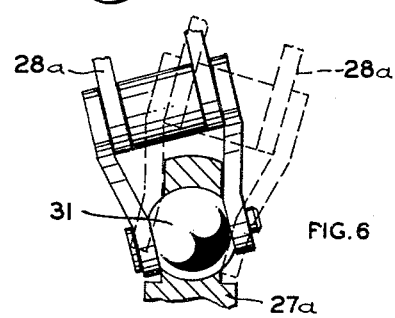
FIG. 6 shows a detail of ball-and-socket anchorage of such transmission chain sections as are otherwise shown in FIG. 5.

Little need be said with regard to the construction of the alternative form of beater chains shown in FIG. 5, and in regard to how such transmission linkages may be mounted on the shaft 26 through a ball and socket connection 31 and 27a, FIG. 6. The transmission links themselves are shown at 28a. The first linkage coupled to the sleeve 27a is best shown in FIG. 5.

It should be well understood by those skilled in the art that while we have endeavored to describe our invention in one of its most practical embodiments, that description is capable of modification in various ways without departing from the spirit and scope of the invention. We wish it to be understood, therefore, that the invention itself is to be protected in accordance with the scope of the claims.

We claim:
1. In a machine of the class described, the combination with an engine having an extended drive shaft of coaxially-driven components which include an array of beater members of link chain formation, the links of which tend to assume centrifugally held radial directions while revoling about said shaft, yet would be displaced by relatively heavy foreign objects if encountered in a mulching process, a hopper-and-drum housing for receiving mulch material to be thrashed by said beater members, said housing being suitably orificed on its under-side to provide scavenging of said foreign objects and ejection thereof, a pneumatic conveying system having fan blades mounted for rotation on said shaft, and a turret-supported discharge spout through which said mulch material may be expelled when carried into the air stream of said conveying system.

2. The combination according to claim 1, and including means permitting free vertical axis rotation of said spout through 360° of arc.

3. The combination according to claim 2, wherein said spout is provided with an elongated nozzle and is universally mounted for raising and lowering the aim at which to expel mulch material or the like.

4. The combination according to claim 1, and including means for mixing a sticky substance with said mulch material after its ejection from said spout.

5. In a machine for processing and distributing mulch material, the combinaation with an engine driven shaft of a plurality of split collar members capable of being clamped thereon at various axial positions, chain sections of variably selected lengths fastened to said collar members, fan blades mounted on said shaft for producing an air stream into which said mulch material may be drawn and upwardly blown, and a two-part drum housing of generally conical shape coaxially disposed about said shaft, the upper part of said drum housing having a hopper portion attached thereto, and the lower part of said drum housing being suitably orificed for air admittance as well as for ejection of relatively heavy foreign material for which scavenging is desired.

6. The combination according to claim 5 and including a pump directly driven from said shaft, and a piping system having a pre-heater through which to circulate an emulsion of asphalt or the like, said pre-heater being arranged to utilize the exhaust from the engine which drives said shaft, thereby to heat said emulsion as drawn by said pump from a given supply source.

7. The combination according to claim 5 and including a universally directive spout arranged for receiving said mulch material as blown from said drum housing, then for spreading the same in any direction through an arc of 360°, said spout being constructed for aiming the spreading operation through a vertical arc of at least 60°.

8. In a machine of the class described, the combination of a series of split collar anchored chain sections, adjustably affixed to an engine shaft, with a drum housing of generally conical shape, said housing having an upper flanged portion bolted together with a lower flanged portion, said shaft extending coaxially through said housing, a hopper structure attached to said upper portion, and a relatively flat-bottomed scavenger-serving outlet part near the large end of said lower portion.

9. The combination according to claim 8 and having a transition structure including a turreted spout having a spout member with an axially rotatable portion and a stationary pedestal portion, an air-seal structure situated between said portions, and a blower driven by said shaft.

10. In a mulching machine, a unitary engine-driven shaft on which are centrifugally suspended a plurality of loosely coupled chain-link sections of different lengths, these sections constituting beater members arranged and adapted to yield to and be displaced by relatively heavy debris, if the same unwantedly accompanies the input of mulch material, a direct-coupled blower, the blades of which are mounted for rotation on said shaft, and a housing of hopper-and-conically-formed-drum configuration, substantially surrounding said beater members, said housing being suitably orificed on its underside to serve for scavenging mulch material of said debris.

11. The combination according to claim 10 and including means concurrently operable with a mulch-producing process, for mixing an emulsion of asphalt or the like with the mulch material.

12. In a mulching machine and spreader, a spout, a blower, a quasi-conical drum having an input-feed hopper on its upperside, said drum being orificed for the output feeding of mulch material through said blower and thence to said spout, said drum being further orificed on its underside for scavenging relatively heavy debris when the latter happens to be unwantedly fed into said hopper, an engine-driven shaft mounted within said drum and through said blower, said shaft carrying the blades of said blower, and a plurality of beater elements composed of loosely coupled chain link sections of different lengths mounted on said shaft, their lengths being chosen for efficient use within the confines of said drum.

13. The combination according to claim 12, and including means having a supply of asphalt emulsion, and piping which leads from said supply to the outlet end of said spout, whereby a controllably heated quantity of said emulsion may be added to said mulch material while spreading the same.

14. The combination according to claim 13, and including adjustable valve equipment in said piping, whereby said asphalt emulsion may be variably mixed with the mulch, or re-circulated, as desired.

15. Motor-driven apparatus for processing and distributing mulch material over a given ground area, comprising motorized mulch processing and blowing components having a suitable housing, a directionally controllable spout connected to said housing for discharge into the outside air of an air-stream impregnated with processed mulch material, a source of asphalt emulsion, adjustable means for producing a suitably proportioned mixture of said emulsion with said mulch material prior to the discharge of same from said spout, and means utilizing heat from the motor of said apparatus to control the fluidity of said emulsion.

16. Apparatus according to claim 15 and including adjustably controlled valve mechanism and piping to variably convey said emulsion, said mechanism being at times operable to inject the emulsion into the spout for impregnation of the mulch material, and otherwise operable to re-circulate the heated emulsion, thereby to retain its fluidity.

References Cited in the file of this patent

UNITED STATES PATENTS

| 540,102 | Kirshman | May 28, 1895 |
| 1,076,061 | Quenner | Oct. 21, 1913 |
| 1,864,672 | Rose | June 28, 1932 |
| 2,842,897 | Finn | July 15, 1958 |
| 2,886,332 | Elwick | May 12, 1959 |

FOREIGN PATENTS

| 708,098 | France | Apr. 27, 1931 |